Jan. 28, 1958  A. BOUWERS  2,821,107
OPTICAL MIRROR SYSTEM COMPRISING AT LEAST
ONE CONIC LENS CORRECTOR ELEMENT

Filed Sept. 1, 1953  4 Sheets-Sheet 1

INVENTOR.
BY A. BOUWERS

United States Patent Office 2,821,107
Patented Jan. 28, 1958

2,821,107

OPTICAL MIRROR SYSTEM COMPRISING AT LEAST ONE CONIC LENS CORRECTOR ELEMENT

Albert Bouwers, The Hague, Netherlands, assignor to N. V. Optische Industrie "de Oude Delft," Delft, Netherlands Application September 1, 1953, Serial No. 377,908

Claims priority, application Netherlands September 12, 1952

5 Claims. (Cl. 88—57)

The centered optical systems hitherto known consist of elements with concave, plane or convex spherical surfaces, whilst of late also elements with aspherical surfaces of more or less complicated shape have sometimes been applied. These aspherical surfaces are difficult to make and the practical results obtained depend on the degree in which the theoretically ideal form is approached.

The invention is relating to optical systems in which there is at least one element (centered in respect of the optical axis) which comprises a reflecting or refracting surface in the shape of a circular cone with straight or practically straight descriptives and with an axis of symmetry coinciding with the optical axis of the system. The conical surface can also be composed of various conical surfaces, each having a different inclination in respect of the optical axis. The other surface, if any, or, as the case may be, the other surfaces in the element can be plane, concave, or convex respectively, and in special cases can also have an aspherical shape. In this description and the claims belonging to it, such an element will be called a "conic element."

The effect of such a conic element according to the invention is based on a principle hitherto unknown or unapplied, which will be illustrated with the aid of the accompanying figures.

Figure 1:
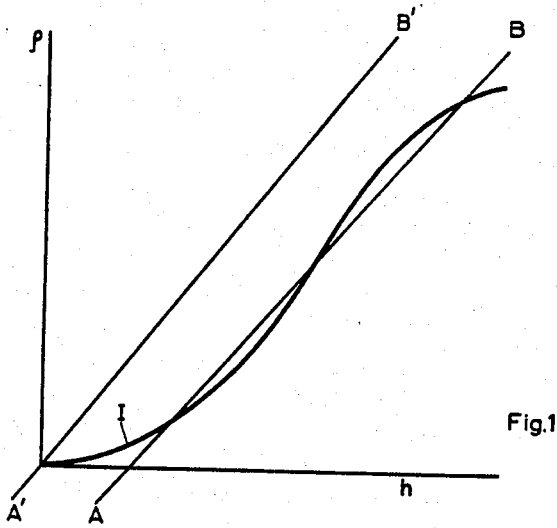

In Fig. 1, curve I represents in the usual way the spherical aberration of an undercorrected optical system, expressed in the lateral deviation $p$ in the paraxial focusing plane, as a function of the height of incidence $h$.

Figure 2:
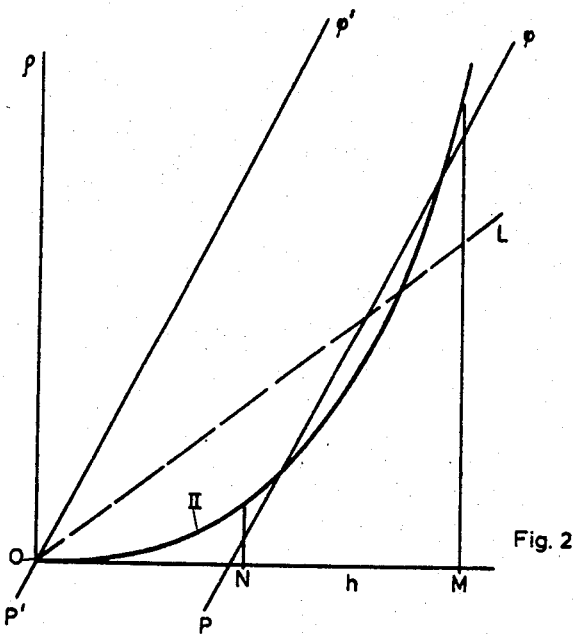

In Fig. 2 the spherical aberration of a single spherical concave mirror is represented as the curve II.

Figure 3:
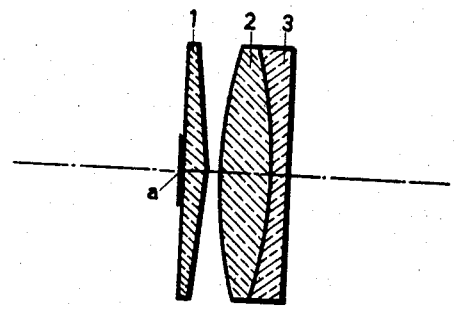
Figure 4:
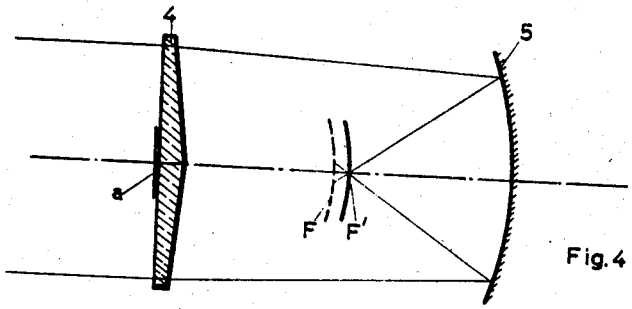
Figure 5:
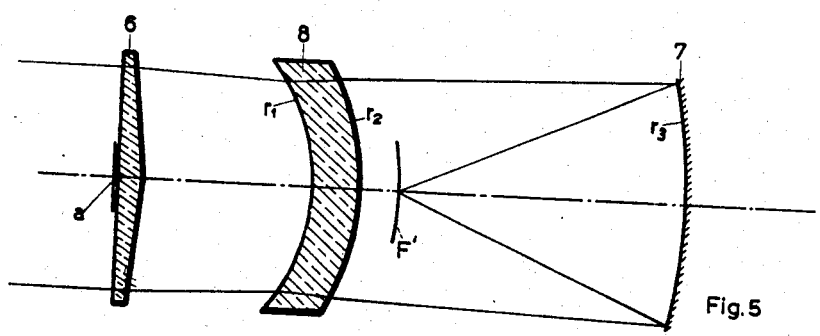

Further, in Figures 3, 4 and 5 some embodiments of optical systems according to the invention are schematically shown, in which conic lenses 1, 4 and 6 respectively are visible. A further description of these systems and of further embodiments of the invention, represented in Fig. 6 and Fig. 7 follows below.

In Fig. 1 the aberration curve I and the straight line A'B' are drawn. This straight line A'B' indicates a focusing plane which deviates from the paraxial focusing plane, because axial shifting of the focusing plane means that in Fig. 1 the $h$-axis rotates about the origin, a fact which is well-known. Now the effect of the conic lens such as represented in Fig. 4, is that when adjustment is made on a plane represented by A'B', aberrations will occur in that plane, which aberrations may be seen from the deviations of curve I from the line AB, which is about parallel to A'B'. This can be understood by realizing that the effect of the conic lens is a constant or practically constant deviation in the direction of undercorrection, by which the aberration curve is moved upwards parallel to itself in the direction of the ordinate. All aberrations in the paraxial plane are increased by the conic lens with a constant or practically constant value, but those in the focusing plane A'B' are decreased to the values which follow from the deviation of curve I from the line AB.

From Fig. 1 it further appears that the part of curve I near the axis, i. e. the part that refers to the central part of the beam of light, shows greater aberrations, for which reason that part will be made inactive by preference according to the invention by means of covering, lacquering or the like of one of the optical elements, e. g. the conic lens. Of course this central part is smaller in surface than a part with equal abscissa-length further from the optical axis, as a ring of a certain width has a much larger surface than a circle the diameter of which is equal to the width of the ring.

The effect of the conic element has been described above in case it is applied to an optical system which has undercorrection without this lens. This will be done by preference according to the invention. In special cases, however, the same principle may also be applied to an overcorrected system, which obtains the right correction with the aid of a conic element.

According to the invention it is recommendable to incorporate the conic element or the conic elements within or near the diaphragm plane of the optical system. In this way the result is obtained that the correction can also be excellent for a larger field of view.

According to a further characteristic of the conic lens according to the invention, the conic lens is achromatized, preferably by a combination of two simple conic lenses made of materials with different dispersions.

A secondary advantage of the invention is that the conic lenses according to the invention can be made of material which is easy to work, e. g. a transparent plastic, on a normal precision-lathe.

In Fig. 2 the curve II represents the aberration of a single concave spherical mirror, without application of a conic lens. The deviation of curve II from the line PQ gives the aberrations when a conic lens is incorporated, measured in the focusing plane represented by the straight line P'Q'. Again it is manifest that the aberrations have been considerably decreased for the zone NM, which forms about three fourths of the whole surface. The aberrations are considerably smaller than they would have been with the most favourable focusing plane without the conic lens (according to dotted line OL, approximately).

In Fig. 3 an optical system according to the invention is shown consisting of conic lens 1, which is centered in respect of the optical system consisting of the positive lens 2 and the negative lens 3.

In Fig. 4 another optical system according to the invention is drawn, consisting of a conic lens 4 and a single spherical concave mirror 5. The conic lens 4 corrects the aberrations of mirror 5 in the way indicated in Fig. 2. The paraxial image plane is represented by F, the focusing plane by F'. In this way an extremely simple, luminous optical system is obtained, which is easy to make.

The optical system shown in Fig. 5 comprises conic lens 6, which is centered in respect of the optical system consisting of mirror 7 and the concentric meniscus 8 centered to it. The radius $r_3$ of the mirror amounts to 226.1 mm. and radii $r_1$ and $r_2$ of the meniscus are 75.2 and 95.7 mm. respectively. Conic lens 6 has a plane surface and the inclination of the conic section is about 1:150. Focusing plane F' is convex.

The optical system, apart from conic lens 6, is a concentric system as described in U. S. Patent No. 2,492,461. The aberrations are again represented in principle by the deviations of curve I from the straight line AB (in Fig. 1).

Experience has shown that aberrations smaller than 60 m$\mu$ may be obtained in an optical system according to Fig. 5 with a relative aperture of 1:0.7, at a focal length of 100 mm.

In the optical systems of Figs. 3, 4 and 5 the central part of the conic lens is made inactive by incorporating the opaque plate a.

Each of conic lenses 1, 4 and 6 has a plane surface and a conical surface.

Another extremely simple embodiment of the system according to the invention is formed by a single lens with a convex surface and a conical surface. Such a lens can e. g. be applied as condenser-lens. As for such a lens the brilliancy must be as great as possible, it is recommendable according to the invention to execute the central part of the conic surface plane or convex, so that it will transmit light.

Furthermore attention may be drawn to the fact that the central part of the conical surface will be replaced by a plane or a spherical part not only in the condenser-lens described just now, but under special circumstances also in other systems according to the invention.

So far mainly conical lenses have been described. For many applications, however, one or more conical, reflecting surfaces can be applied which also have the form of a circular cone with straight or practically straight descriptives and with an axis of symmetry which coincides with the optical axis of the system.

The advantages obtained in this way are:

(1) The reflecting conical surface is completely free from chromatic aberrations.

(2) The deviation produced by a conic mirror is, with equal angle of inclination, about 4 × greater than with a refractive conical surface, so that for the same deviation required, a 4 × smaller angle of inclination will suffice, which simplifies the manufacture of the surface.

(3) A reflecting conical surface is completely free from astigmatism.

Figure 7:
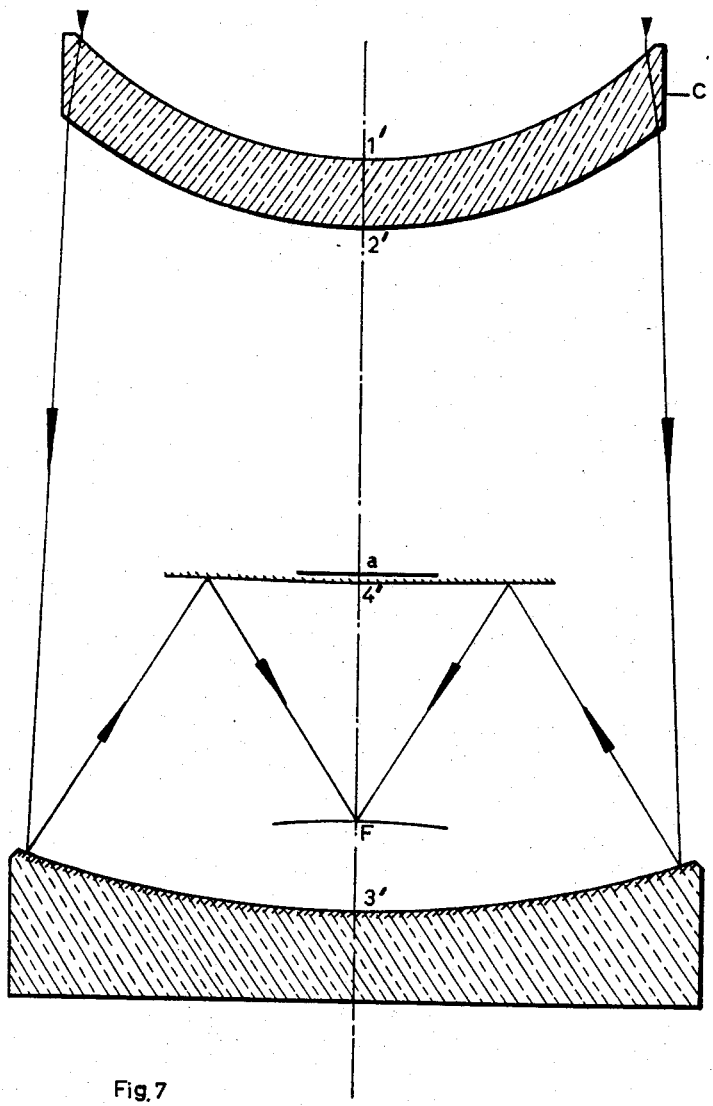

A reflecting conical surface according to the invention can be applied in many ways to many systems. We shall restrict ourselves here to one example, which is represented in Fig. 7.

The optical system consists of a corrector-lens C with boundary surfaces 1' and 2', a spherical concave mirror with reflecting surfaces 3' and the reflecting conical surface 4'. The incident rays of light first pass corrector-lens C and are then focused in F after reflection on reflecting surfaces 3' and 4'.

The radii of curvature of surfaces 1', 2' and 3' amount to 83.2, 97.7 and 213.8 mm. respectively. The thickness of corrector-lens C is 14.5 mm. and the distance between the surfaces 2' and 3' is 116.1 mm. Conical surface 4' is at a distance of 65.8 mm. from reflecting surface 3', whilst focus F is at 17.8 mm. from surface 3'. Corrector C is made of glass with $n_D=1.517$ and dispersion number $\nu=64.2$. The focal length of the whole system amounts to 100 mm. and the relative aperture is 1:0.9.

Half the apex angle of conical surface 4' amounts to 89° 56' 30", i. e. the conic mirror deviates only 3' 3" from a plane mirror. By the application of this conic mirror 4', which is comparatively easy to make, a resolving power is obtained which is about three times higher than it would be possible to obtain with an optimally corrected system which also contains a corrector C and a concave reflecting plane 3', but is provided with a plane reflecting mirror. This result is obtained without astigmatism or chromatic aberration being introduced.

For reasons of manufacture it is often desirable to provide the conic mirror 4' with a central aperture, in which case an opaque plate a will be incorporated by preference.

Further, in many cases it is recommendable to provide mirror 3' with a central aperture, in order to make the image plane near F easily accessible.

Finally a particular embodiment of the invention will be described, which is especially suitable for imaging objects situated in the finite.

For in that case the problem arises, that the rays of light originating from a point on the border of the field are incident on the conic lens under different angles of incidence, on account of which the deviation of the various rays of light is no longer constant. This disadvantage can be met according to the invention by incorporation into the system a conic lens with two conical surfaces, both of which turn their concave side to the object. The inclination of the conical surface turned to the object side can be chosen in such a way that with a given object distance and a given size of the object, the rays of light directed from the border of the object plane to the upper and under zone of the conic lens respectively, are incident on the conic lens under about equal angles.

Figure 6:
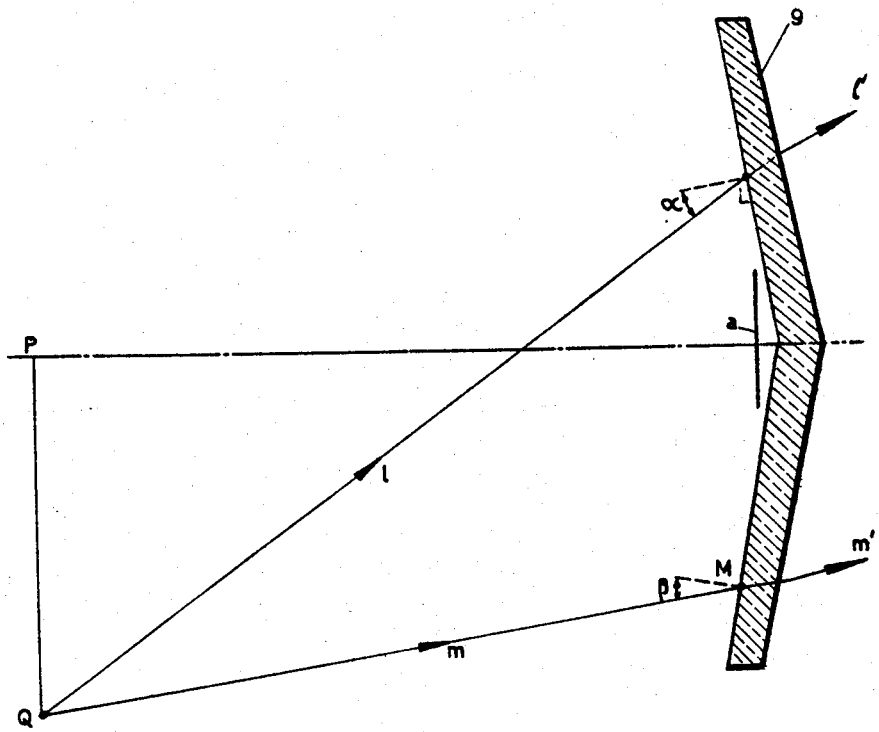

In the accompanying schematical Fig. 6 this embodiment of the conic lens according to the invention is shown by way of example.

Conic lens 9 consists of two conical surfaces, both of which turn their concave side to the object PQ. The rays of light $l$ and $m$ originating from the borderpoint Q of the object are incident on the conic lens 9 in L and M respectively under angles $\alpha$ and $\beta$ respectively, which are practically equal. This means that the emergent rays $l'$ and $m'$ have undergone practically the same deviation, so that the concave conic lens of this form introduces no aberrations which would have been the case with a plane conic lens.

I claim:

1. Reflecting optical imagery system comprising in axial alignment a spherical concave mirror and a conical lens means, said conical lens means comprising at least one convex refractive surface in the shape of a circular cone, having its axis of rotation coinciding with the optical axis and being positioned substantially at the center of curvature of said mirror, the image surface of said system being positioned between the paraxial focal point of said spherical mirror and said mirror itself at a location where the lateral spherical aberrations in the image surface introduced by said spherical mirror in the absence of said conical lens means are substantially constant for light-rays originating from the axial point of the object and entering the system throughout the effective aperture area of the system and said conical lens means giving said light rays a substanitally constant deviation towards the optical axis of said system whereby said lateral spherical aberrations are substantially corrected.

2. Reflecting optical imagery system comprising in axial alignment a concave spherical mirror, a refractive spherical aberration correcting meniscus element having substantially spherical refractive surfaces and facing with its concave side the centre of curvature of said mirror, and being located between the center of curvature of said mirror and said mirror in operative alignment therewith and axially spaced therefrom, and a conical lens means having at least one refractive surface having the shape of a circular cone and being positioned substantially at the center of curvature of said mirror, said meniscus element correcting the spherical aberration introduced in the optical system by said mirror except for a definite residual aberration and said conical lens means giving the effective light rays a substantially contant deviation whereby said residual aberration is substantially corrected.

3. Reflecting optical imagery system comprising in axial alignment a concave spherical mirror, a refractive spherical aberration correcting meniscus element having substantially spherical refractive surfaces and facing with its concave side the centre of curvature of said mirror, and being axially spaced at a distance from said mirror greater than the radius of curvature of said mirror and in operative alignment therewith, and a conical lens means having at least one refractive surface having the shape of a circular cone and being positioned substantially at the center of curvature of said mirror, said meniscus element correcting the spherical aberration introduced in the optical system by said mirror except for a definite residual aberratio and said conical lens means giving the effective light rays a substantially constant deviation whereby said residual aberration is substantially corrected.

4. Reflecting optical imagery system as set forth in claim 2 wherein said conical lens has two refractive surfaces in the shape of circular cones, the apices of both of said cones being turned towards said spherical mirror.

5. Reflecting optical imagery system as set forth in claim 3 wherein said conical lens has two refractive surfaces in the shape of circular cones, the apices of both of said cones being turned towards said spherical mirror.

References Cited in the file of this patent

UNITED STATES PATENTS

| | | |
|---|---|---|
| 1,501,979 | Willson | July 22, 1924 |
| 1,985,074 | Bauersfeld | Dec. 18, 1934 |
| 2,059,033 | Rivier | Oct. 27, 1936 |
| 2,101,016 | Beach | Dec. 7, 1937 |
| 2,170,979 | Straubel | Aug. 29, 1939 |
| 2,492,461 | Bouwers | Dec. 27, 1949 |
| 2,504,383 | Bouwers et al. | Apr. 18, 1950 |
| 2,531,956 | Waldorf et al. | Nov. 28, 1950 |

FOREIGN PATENTS

| | | |
|---|---|---|
| 544,694 | Great Britain | Apr. 23, 1942 |

OTHER REFERENCES

Maksutov: Article in Journal of Optical Society of America, "New Catadioptric Meniscus Systems," volume 34, May 1944, pages 270–284.